(12) United States Patent
Autry

(10) Patent No.: US 6,990,577 B2
(45) Date of Patent: Jan. 24, 2006

(54) UPDATING A BIOS IMAGE BY REPLACING A PORTION OF THE BIOS IMAGE WITH A PORTION OF ANOTHER BIOS IMAGE

(75) Inventor: Mark A. Autry, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 592 days.

(21) Appl. No.: 09/928,162

(22) Filed: Aug. 10, 2001

(65) Prior Publication Data

US 2003/0033515 A1 Feb. 13, 2003

(51) Int. Cl.
G06F 15/177 (2006.01)
G06F 9/24 (2006.01)
G06F 9/44 (2006.01)
G06F 9/45 (2006.01)

(52) U.S. Cl. .............................. 713/100; 713/1; 713/2; 717/168; 717/171

(58) Field of Classification Search ................ 713/1, 713/2, 100; 714/5, 15
See application file for complete search history.

(56) References Cited

U.S. PATENT DOCUMENTS

| | | | | |
|---|---|---|---|---|
| 5,864,698 A | * | 1/1999 | Krau et al. | 713/2 |
| 5,930,504 A | * | 7/1999 | Gabel | 713/2 |
| 5,964,873 A | * | 10/1999 | Choi | 713/2 |
| 6,205,548 B1 | * | 3/2001 | Hasbun | 713/2 |
| 6,237,091 B1 | * | 5/2001 | Firooz et al. | 713/1 |
| 6,308,265 B1 | * | 10/2001 | Miller | 713/2 |
| 6,665,813 B1 | * | 12/2003 | Forsman et al. | 714/15 |
| 2002/0078338 A1 | * | 6/2002 | Lay et al. | 713/2 |

* cited by examiner

Primary Examiner—Lynne H. Browne
Assistant Examiner—James K. Trujillo
(74) Attorney, Agent, or Firm—Trop, Pruner & Hu, P.C.

(57) ABSTRACT

A technique includes receiving a first basic input/output system image to replace an existing second basic input/output system image stored in a firmware memory. The first basic input/output system image is modified by replacing a portion of the first basic input/output system image with a portion of the second basic input/output system image. The modified first basic input/output system image is written to the firmware memory to replace the second basic input/output system image.

28 Claims, 5 Drawing Sheets

UPDATING A BIOS IMAGE BY REPLACING A PORTION OF THE BIOS IMAGE WITH A PORTION OF ANOTHER BIOS IMAGE

BACKGROUND

The invention generally relates to upgrading a BIOS.

Operating systems have continually evolved. For example, older computer systems (8086, 8088 or 80286 processor-based computer systems, as examples) use sixteen bit real mode operating systems, such as MS-DOS operating systems. However, these operating systems lack multi-tasking and memory management features provided by more recent operating systems, such as thirty-two bit and sixty-four bit virtual mode operating systems.

A typical computer system includes a basic input/output system (BIOS), a term that refers to firmware that, when executed, controls various functions (keyboard, disk drives and display screen functions, for example) of the computer system at a basic level. Due to its ability to control the disk drives when the computer system "boots up," the BIOS is responsible for loading the operating system. In this manner, the typical computer system boots up by executing BIOS instructions that cause a operating system loader program to be loaded from a disk drive into system memory. The BIOS may then cause the computer system to execute the loader program that, in turn, causes the computer system to load portions of the operating system into the system memory. Subsequently, the operating system may execute one or more program(s) to initialize and start execution of the operating system.

The BIOS image (i.e., the program code and parameter space that define the BIOS) is stored in a memory that does not lose its stored contents when power to the computer system is removed. For example, the BIOS image may be stored in a FLASH memory, an erasable electrically programmable read only memory (EEPROM) that may be rapidly updated. Thus, due to its storage in the FLASH memory, the existing BIOS image may be replaced to upgrade the BIOS. However, a difficulty with updating the BIOS is that for some operating systems (a sixty-four bit operating system, for example), the existing BIOS image that is stored in the FLASH contains configuration data (boot options and other configuration data, for example) that is specific to the particular computer system. Therefore, when the existing BIOS image is replaced, the existing configuration data is overwritten, which means the configuration data must be reconstructed. Unfortunately, rebuilding of the configuration data may be a time-consuming process in that a user of the computer system may be prompted to manually select various options for purposes of rebuilding the configuration data.

Thus, there exists a continuing need for a technique to address one or more of the problems that are stated above.

DETAILED DESCRIPTION

Figure 1:
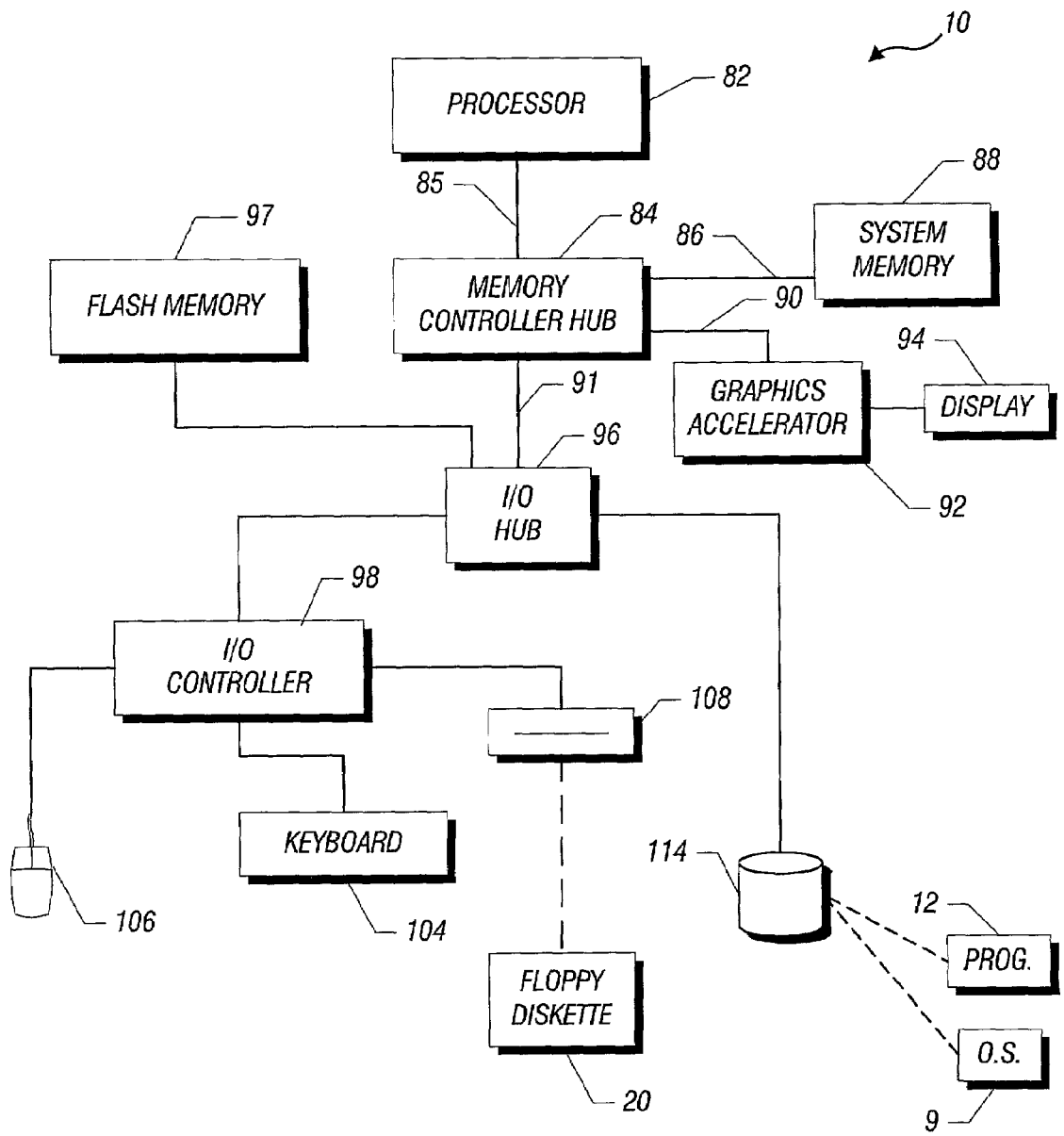
FIG. 1 is a schematic diagram of a computer system according to an embodiment of the invention.

Referring to FIG. 1, an embodiment 10 of a computer system in accordance with the invention includes a FLASH memory 97 that stores a basic input/output system (BIOS) image (i.e., the program code and parameter space that define a BIOS) for purposes of establishing a BIOS for the system 10. Over the course of its lifetime the BIOS may be upgraded, a process that involves replacing the current, or existing, BIOS image that is stored in the FLASH memory 97 with a replacement BIOS image. As described below, in contrast to conventional computer systems, the computer system 10 takes measures to minimize the need to reconstruct BIOS configuration data for the newly installed, upgraded BIOS.

Figure 2:
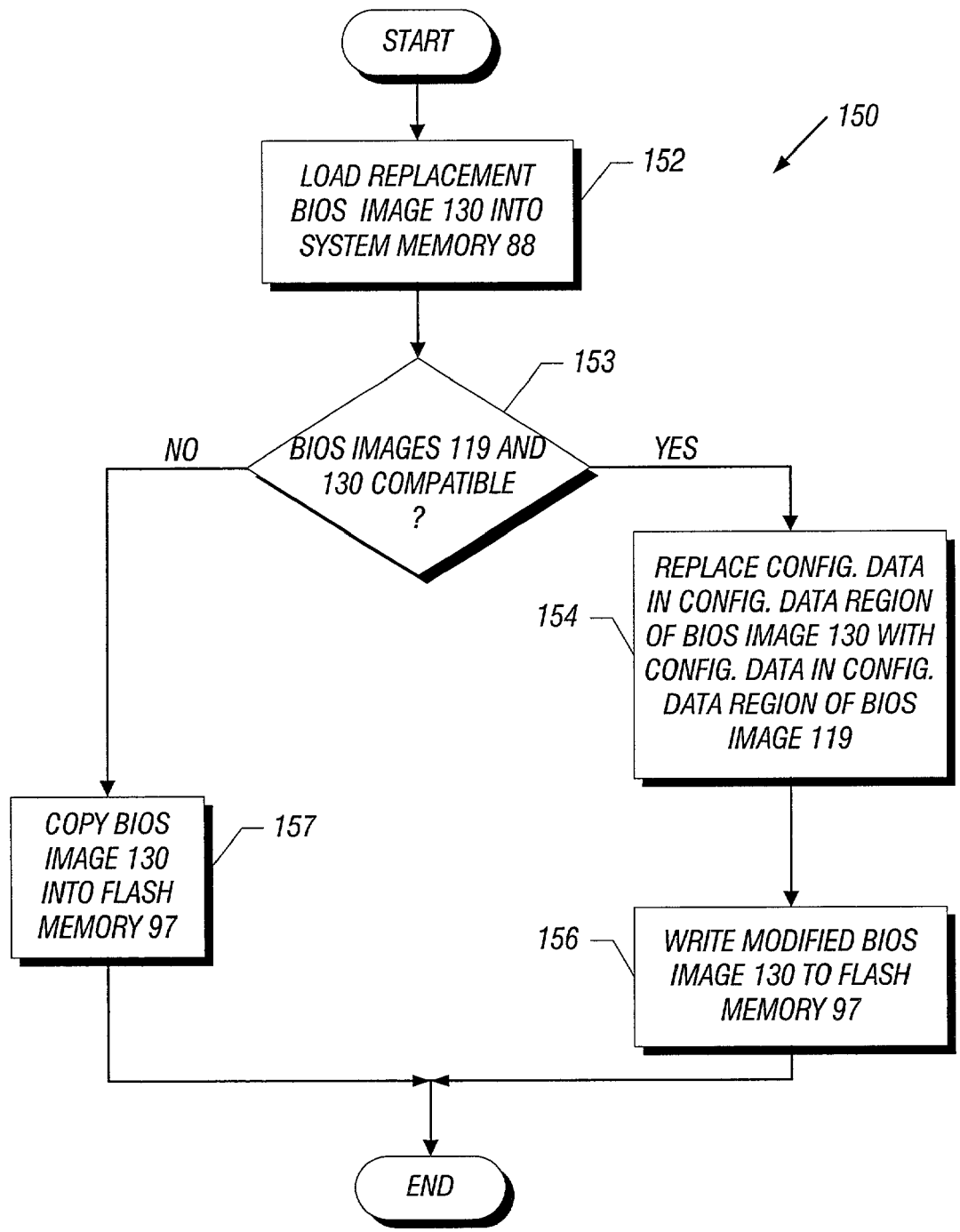
FIG. 2 is a flow diagram depicting a technique to upgrade a BIOS of the computer system of FIG. 1 according to an embodiment of the invention.

In this manner, as described below, before the upgrade occurs, the existing BIOS image that is stored in the FLASH memory 97 may include a configuration data region, a region that may store, for example, data that indicates various boot options (for example) and other options that are specifically configured for the computer system 10. Thus, if the BIOS is upgraded by simply overwriting the existing BIOS image with a replacement BIOS image, the existing configuration data region (that is part of the existing BIOS image) would be overwritten and significant user involvement may be needed to reconstruct the specific BIOS configuration data for the computer system. However, for purposes of preventing this scenario from occurring, the computer system 10 generally performs a technique 150 (that is depicted in FIG. 2) to upgrade the system's BIOS. As described below, in the technique 150, the computer system 10 takes measures to preserve data from the configuration data region of the existing BIOS image and use this preserved data as the configuration data for the replacement BIOS image.

Referring to both FIGS. 1 and 2, in accordance with the technique 150, the computer system 10 begins the BIOS upgrade by loading (block 152) a replacement BIOS image into a system memory 88 of the system 10. As an example, the replacement BIOS image may be initially stored on a floppy diskette 20 and transferred to the computer system 10 via a floppy disk drive 108 of the system 10. Next in the technique 150, the computer system 10 determines (diamond 153) whether the existing and replacement BIOS images are compatible for purposes of replacing data from the configuration data region of the replacement BIOS image with data from the configuration data region of the existing BIOS image. If this compatibility does not exist, then the computer system 10 copies (block 157) the replacement BIOS image 130 into the FLASH memory 97, overwrites the existing BIOS image and thus, effectively overwrites the existing configuration data. Otherwise, if the computer system 10 determines (diamond 153) that compatibility exists, the computer system 10 replaces (block 154) the configuration data in the configuration region of the replacement BIOS image with the data from the configuration data region of the existing BIOS image. This replacement occurs in the system memory 88. Subsequently, the computer system 10 writes (block 156) the modified replacement BIOS image from the system memory 88 to the FLASH memory 97 to overwrite the previously existing BIOS image.

Figures 3, 4:
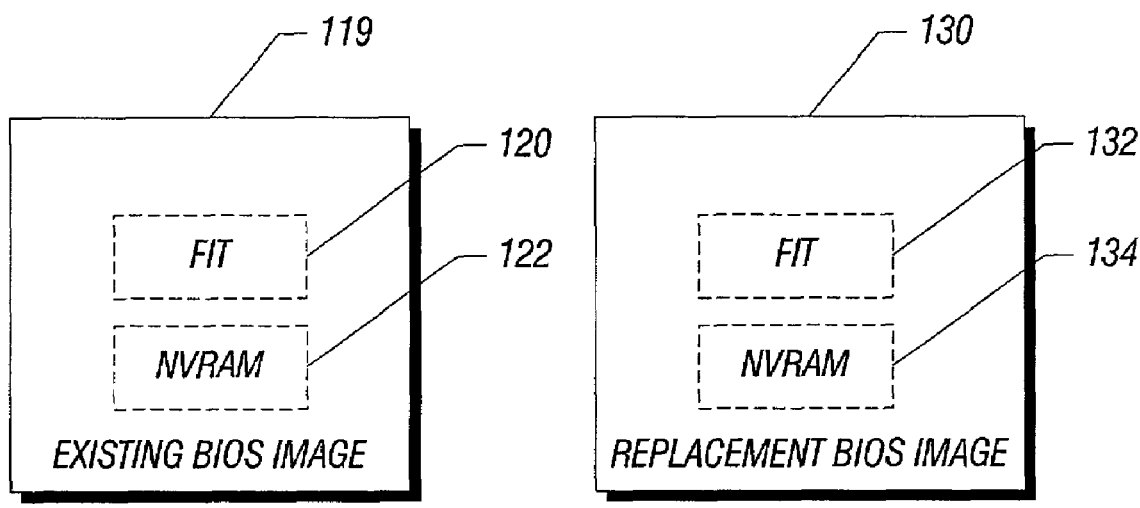
FIG. 3 is an illustration of an existing BIOS image installed on the computer system according to an embodiment of the invention.
FIG. 4 is an illustration of a replacement BIOS to upgrade the computer system's BIOS according to an embodiment of the invention.

FIG. 3 depicts an exemplary embodiment 119 of an existing BIOS image that may be stored in the FLASH memory 97. This existing BIOS image 119 defines the existing BIOS to be upgraded. The BIOS image 119 includes a non-volatile random access memory (NVRAM) section 122, a section that serves as the configuration data region and stores the BIOS configuration data. In some embodiments of the invention, the NVRAM section 122 is locked from write operations and thus, is generally configured as a read only section. The NVRAM section 122 may be unlocked for purposes of updating the BIOS image that is stored in the FLASH memory 97.

In some embodiments of the invention, the BIOS image 119 includes a firmware interface table (FIT) 120 that is used for purposes of finding sections or layers of the BIOS image 119, such as the NVRAM section 122, for example. In some embodiments of the invention, the FIT 120 may be located in the NVRAM section 122.

FIG. 4 depicts an exemplary embodiment of a replacement BIOS image 130 that may be used to at least partially update the BIOS image 119. In particular, the BIOS image 130 generally includes a FIT 132 and an NVRAM section 134. The NVRAM section 134 does not contain the BIOS configuration data (contained in the NVRAM 122) that is specific to the computer system 10. For purposes of ensuring that the data in the NVRAM section 122 of the existing BIOS image 119 may be used to replace the data in the NVRAM section 134 of the replacement BIOS image 130, the computer system 10 performs a compatibility check. In this manner, it is possible that the BIOS images 119 and 130 may have different structures and are governed by different standards. Thus, if the computer system 10 detects an incompatibility between the BIOS images 119 and 130, the computer system 10 does not modify the replacement BIOS image 130, but instead, the computer system 10 writes the unmodified replacement BIOS image 130 to the FLASH memory 97 to replace the existing BIOS image 119.

In some embodiments of the invention, to perform the compatibility check, the computer system 10 initially determines such parameters as the location and size of the NVRAM section 122. The computer system 10 then compares these parameters to corresponding parameters of the NVRAM section 134, such as the location and size of the NVRAM section 134.

To find the location of the NVRAM section 134 in system memory 88, the computer system 10 first determine the location of the FIT 132. Thus, the computer system 10 performs address translations to translate the FLASH memory address of the FIT 132 into the current address of the FIT 132 in system memory 88. From the FIT 132, the computer system determines the location of the NVRAM section 134. However, the FIT 132 points to the address of the NVRAM section 134 if stored in the FLASH memory 97. Therefore, the computer system 10 performs address translations to determine the address of the NVRAM section 134 in system memory 88. Once this has been determined, the computer system 10 determines if the sizes and locations of the NVRAM sections 122 and 134 match, so that the NVRAM section 134 may be replaced with the NVRAM section 122.

If the corresponding parameters match (the sizes and locations match, as an example), then the computer system 10 deems the two BIOS images 119 and 130 to be compatible for purposes of replacing the data in the NVRAM section 134 with the data in the NVRAM section 122.

Turning now to a more specific embodiment, referring back to FIG. 1, the computer system 10 may include a processor 82 that executes a program 12 (a script, for example) to perform a technique 180 (depicted in FIGS. 5 and 6) to upgrade the system's BIOS. As an example, the program 12 may be stored on a hard disk drive 114 of the computer system 10.

Figure 5:
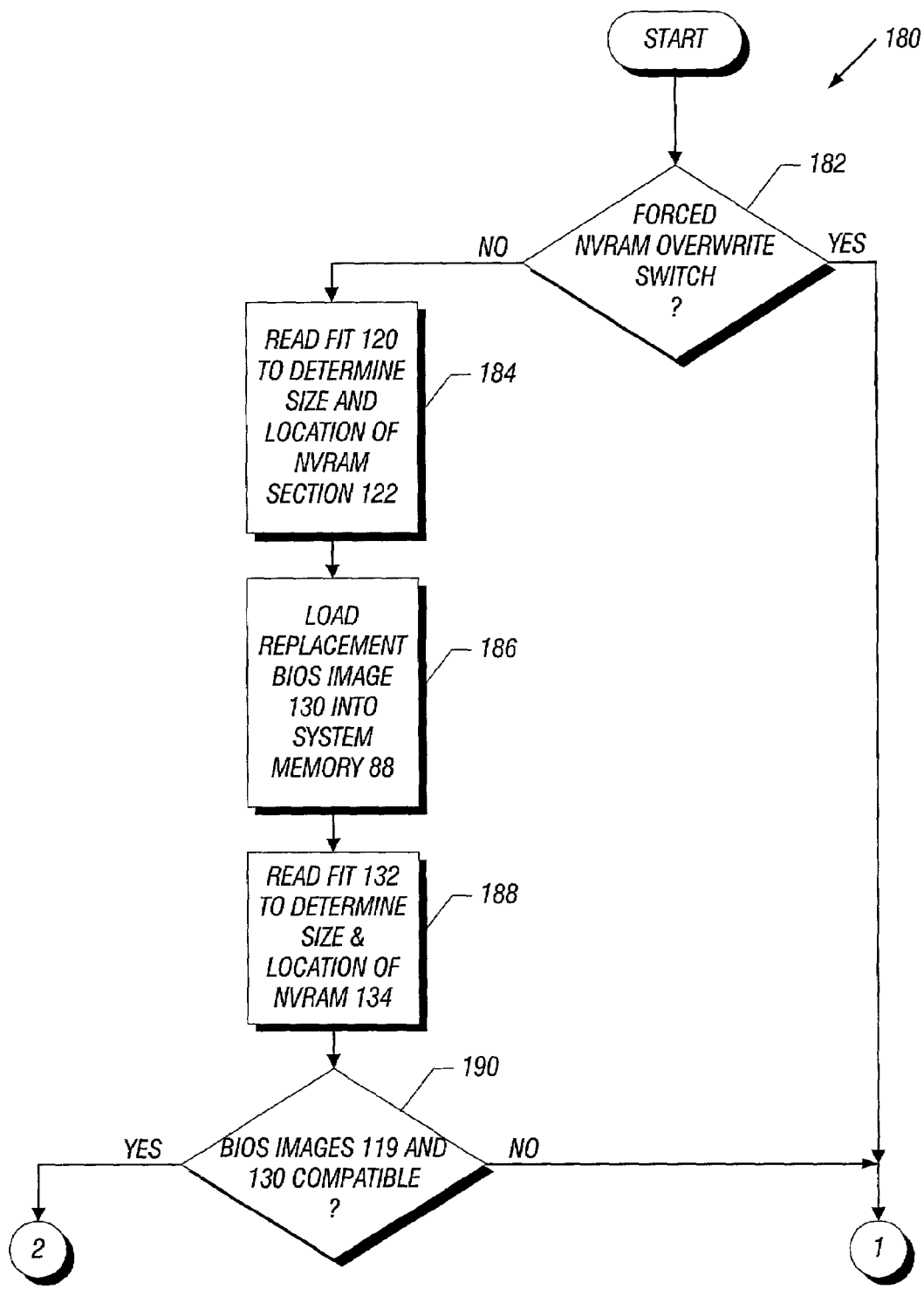
FIGS. 5 and 6 depict a more detailed flow diagram of a technique to upgrade the BIOS of the computer system of FIG. 1 according an embodiment of the invention.
Figure 6:
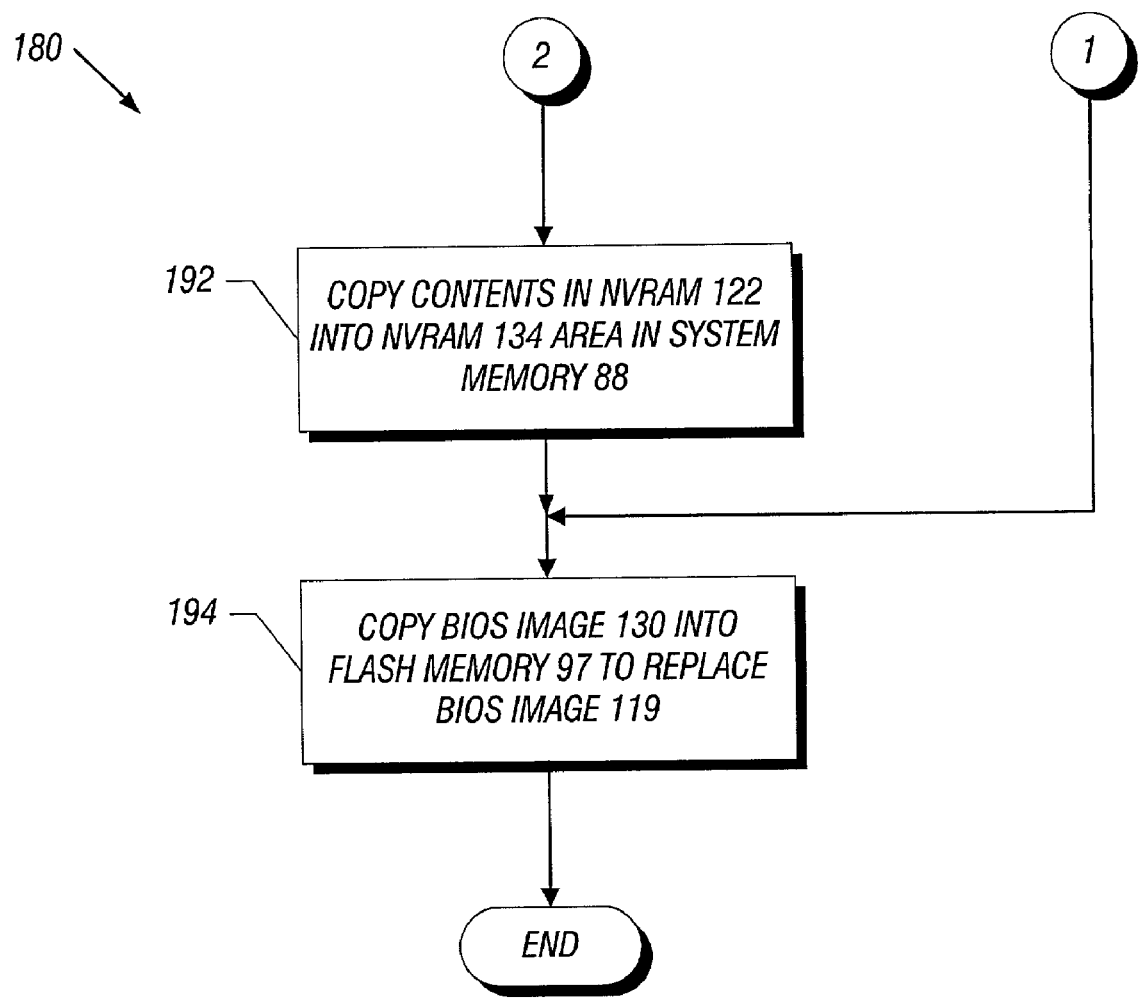

Referring to FIGS. 5 and 6, in the technique 180, the processor 82 determines (diamond 182) whether a software flag, or switch, has been set to force the overwrite of the NVRAM section 122 of the existing BIOS image 119. If so, the processor 82 copies (block 194 (see FIG. 6)) the replacement BIOS image 130 into the FLASH memory 97 without modification to replace the existing BIOS image 119.

Otherwise, if the overwriting of the NVRAM section 122 has not been forced, the processor 82 reads (block 184) the FIT 120 to determine the size and location of the NVRAM section 122. Next, the processor 82 loads (block 186) the replacement BIOS image 130 into the system memory 88 and reads (block 188) the FIT 132 to determine the size and location of the NVRAM section 134. If the processor 82 subsequently determines (diamond 190) that the BIOS images 119 and 130 are compatible, then the processor 82 copies (block 192) the contents of the NVRAM section 122 into the NVRAM 134 section (in system memory 88) to modify the BIOS image 130 with the configuration data. If the BIOS images 119 and 130 are incompatible, the processor 82 skips block 192. Next, the processor 82 copies (block 194) the BIOS image 130 (modified or unmodified, depending on the determined compatibility) into the FLASH memory 97 to replace the BIOS image 119 and complete the upgrade.

Referring back to FIG. 1, besides the FLASH memory 97, system memory 88 and processor 82, in some embodiments of the invention, the computer system 10 includes a north bridge circuit, or memory controller hub 84, that permits the processor 82 to communicate with other components of the system 10. In some embodiments, the processor 82 may serve as the bootstrap processor and may execute an operating system 9 that is stored on the hard disk drive 114 of the computer system 10. Besides providing a system bus 85 to the processor 82, the memory controller hub 84 may also provide an interface to a memory bus 86, an Accelerated Graphics Port (AGP) bus 90 and a hub interface 91. The AGP is described in detail in the Accelerated Graphics Port Interface Specification, Revision 1.0, published on Jul. 31, 1996, by Intel Corporation of Santa, Clara, Calif. The system memory 88 may be coupled to the memory bus 86, and a graphics accelerator 92 may be coupled to the AGP bus 90. The graphics accelerator 92 furnishes signals to control a display 94.

The memory hub 84 may communicate with a south bridge circuit, or input/output (I/O) hub 96, via the hub link 91. The I/O hub 96 may provide an interface to the FLASH memory 97, an I/O controller 98 and a Peripheral Component Interconnect (PCI) bus 102, as examples. The PCI Specification is available from The PCI Special Interest Group, Portland, Oreg. 97214. The I/O controller 98 and receives input from a mouse 106 and a keyboard 104 and may also control operations of the floppy disk drive 108. As an example, as noted above, the floppy diskette 20 that contains the replacement BIOS image 130 may be inserted into the floppy disk drive 108. The hard disk drive 114 may be coupled to the I/O hub 96 and store such items as the program 12 and the operating system 12.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
receiving a first basic input/output system image to replace an existing second basic input/output system image stored in a firmware memory, the first basic input/output system image including a first computer system configuration data section and the second basic input/output system comprising a second computer system configuration data section;
comparing the first computer system configuration data section with the second computer system configuration data section to check for compatibility between the first computer system configuration data section and the second computer configuration data section;
based on the comparison, modifying the first basic input/output system image by replacing a portion of the first basic input/output system image with a portion of the second basic input/output system image; and
writing the modified first basic input/output system image to the firmware memory to replace the second basic input/output system image.

2. The method of claim 1, wherein the portion of the second basic input/output system image comprises configuration data for a computer system.

3. The method of claim 2, wherein the configuration data comprises boot options for a computer system.

4. The method of claim 1, wherein the portion of the second basic input/output system image corresponds to a portion of the second basic input/output system image locked from a write operation.

5. The method of claim 1, wherein the receiving comprises:
storing the first basic input/output system image in a system memory of a computer system.

6. The method of claim 1, further comprising:
using a FLASH memory for the firmware memory.

7. The method of claim 1, wherein the comparing comprises:
comparing a size of the first computer system configuration data section with a size of the second computer system configuration data section.

8. The method of claim 1, wherein the comparing comprises:
comparing a location of the first computer system configuration data section with a location of the second computer system configuration data section.

9. A computer system comprising:
a firmware memory storing an existing basic input/output system image comprising a first configuration data section; and
a processor to:
compare the first configuration data section with a second configuration data section of a replacement basic input/output system image;
based on the comparison, modify the replacement basic input/output system image by replacing a portion of the replacement basic input/output system image with a portion of the existing basic input/output system image; and
write the modified replacement basic input/output system image to the firmware memory to replace the existing basic input/output system image.

10. The computer system of claim 9, wherein the portion of the existing basic input/output system image comprises configuration data for the computer system.

11. The computer system of claim 10, wherein the configuration data comprises boot options for the computer system.

12. The computer system of claim 9, wherein the portion of the existing basic input/output system image corresponds to a region of the firmware memory locked from writes.

13. The computer system of claim 9, further comprising:
a system memory,
wherein the processor stores the replacement basic input/output system image in the system memory.

14. The computer system claim 9, wherein the firmware memory comprises a FLASH memory.

15. The computer system of claim 9, wherein the processor compares a size of the first configuration data section with a size of the second configuration data section.

16. The computer system of claim 9, wherein the processor compares a location of the first configuration data section with a location of the second configuration data section.

17. An article comprising a computer readable storage medium storing instructions to cause a processor to:
compare a configuration data section of an existing basic input/output system image stored in a firmware memory with a second configuration data section of a replacement basic input/output system image;
based on the comparison, modify the replacement basic input/output system image by replacing a portion of the replacement basic input/output system image with a portion of the existing basic input/output system image stored in a firmware memory; and
write the modified replacement basic input/output system image to the firmware memory to replace the existing basic input/output system image.

18. The article of claim 17, wherein the portion of the existing basic input/output system image comprises configuration data for a computer system.

19. The article of claim 18, wherein the configuration data comprises boot options for a computer system.

20. The article of claim 17, wherein the portion of the existing basic input/output system image corresponds to a region of the firmware memory locked from writes.

21. The article of claim 17, the storage medium storing instructions to cause the processor to store the replacement basic input/output system image in a system memory of a computer system.

22. The article claim 17, wherein the firmware memory comprises a FLASH memory.

23. The article of claim 17, the storage medium storing instructions to cause the processor to:
compare a size of the first configuration data section with a size of the second configuration data section.

24. The article of claim 17, the storage medium storing instructions to cause the processor to:
compare a location of the first configuration data section with a location of the second configuration data section.

25. A method comprising:
receiving a first basic input/output system image to replace an existing second basic input/output system image stored in a firmware memory, the first basic input/output system image including a configuration data section for a computer system;
determining at least one of the size and the location of the configuration data section; and
based on the determination, modifying the first basic input/output system image by replacing a portion of the first basic input/output system image with a portion of the second basic input/output system image; and writing the modified first basic input/output system image to the firmware memory to replace the second basic input/output system image.

26. The method of claim 25, wherein the configuration data section comprises data indicating boot options for a computer system.

27. The method of claim 25, wherein the portion of the second basic input/output system image corresponds to a portion of the second basic input/output system image locked from a write operation.

28. The method of claim 25, wherein the receiving comprises:
storing the first basic input/output system image in a system memory of a computer system.

* * * * *